UNITED STATES PATENT OFFICE.

JEAN ANTOINE MATHIEU, OF DETROIT, MICHIGAN.

PROCESS OF EXTRACTING METALS FROM ORES.

SPECIFICATION forming part of Letters Patent No. 359,165, dated March 8, 1887.

Application filed September 8, 1882. Serial No. 71,407. (No specimens.)

*To all whom it may concern:*

Be it known that I, JEAN ANTOINE MATHIEU, of Detroit, in the county of Wayne and State of Michigan, have invented a new and useful Improvement in Processes of Extracting Metals from Ores, of which the following is a specification.

The present invention relates to a process specially designed for extracting metals from lead ores, and it is described as follows, viz:

I take any ore from which lead can be procured—as, for example, the carbonates of lead found at Leadville—and crush and grind the same. I then submit the ore to the steam from boiling acetic acid for a period varying from three to ten hours, for which purpose the apparatus shown and described in Letters Patent No. 234,998, granted to me November 30, 1880, may be used. I then place the steamed ore in a bath of acetic acid, in which I also put equal quantities of acetate of lime and acetate of soda, for the purpose of dissolving the sulphate of lead and the sulphate and chloride of silver, gold, &c., such as are found in the carbonates of lead of the origin above indicated. Thereupon the bath is caused to boil strongly from three to five hours, keeping it well stirred. The bath is then allowed to cool to a temperature slightly below the boiling-point, and kept quiet at this temperature until all solid matters therein settle to the bottom. After settling the liquor is drawn off into another tub, and from the residuum in the bottom of the tub the metal therein contained may be extracted in any of the usual modes. The precious metals—such as silver and gold—are extracted from the liquor by hanging therein lead electrodes and passing through said electrodes and liquor an electric current, which causes the silver or gold in solution to be deposited on one of the lead electrodes.

In my Patent No. 305,524, of 1884, I disclose a process of making acetates directly from ores, consisting in sprinkling the ground ore with acetic acid, exposing the sprinkled ore to air, separating the salt thus formed by addition of water, then exposing the residual ore to the action of acetic-acid vapors, separating the salt thus formed, and finally crystallizing or evaporating the solution thus previously obtained.

The process heretofore patented is specially applied to the treatment of copper ores, while the one embraced in the present case is designed for lead ores, and differs from the other chiefly in making use of the double acetate of lime and soda for the objects fully stated.

Having thus described my invention, what I claim is—

The herein-described method of extracting metals from lead ores, consisting in subjecting ground ore to hot vapors of acetic acid, boiling the steamed ore in a bath composed of acetic acid and equal quantities of acetate of lime and acetate of soda, and separating from the liquid any precious metals held in solution therein by means of an electric current, substantially as herein set forth.

JEAN ANTOINE MATHIEU.

Witnesses:
DANIEL E. PRESCOTT,
HENRY C. MOOERS.